US012681730B2

(12) United States Patent
Simpson

(10) Patent No.: US 12,681,730 B2
(45) Date of Patent: Jul. 14, 2026

(54) MEASURING PERFORMANCE ASSOCIATED WITH PROCESSING INSTRUCTIONS BASED ON COUNTERS FOR DIFFERENT EVENTS

(71) Applicant: SiFive, Inc., San Mateo, CA (US)

(72) Inventor: David John Simpson, San Jose, CA (US)

(73) Assignee: SiFive, Inc., Santa Clara, CA (US)

( * ) Notice: Subject to any disclaimer, the term of this patent is extended or adjusted under 35 U.S.C. 154(b) by 147 days.

(21) Appl. No.: 18/357,984

(22) Filed: Jul. 24, 2023

(65) Prior Publication Data

US 2025/0036413 A1      Jan. 30, 2025

(51) Int. Cl.
G06F 9/32       (2018.01)
G06F 9/38       (2018.01)
G06F 11/34      (2006.01)

(52) U.S. Cl.
CPC ............ G06F 9/321 (2013.01); G06F 9/3854 (2023.08); G06F 11/3466 (2013.01)

(58) Field of Classification Search
CPC ..... G06F 9/321; G06F 9/3854; G06F 11/3466
See application file for complete search history.

(56) References Cited

U.S. PATENT DOCUMENTS

| | | | | |
|---|---|---|---|---|
| 2001/0039488 A1* | 11/2001 | Swoboda | ............... | G06F 9/455 |
| | | | | 703/17 |
| 2012/0227045 A1* | 9/2012 | Knauth | ................. | G06F 9/3842 |
| | | | | 718/100 |
| 2013/0007533 A1* | 1/2013 | Miller | ................. | G06F 11/3466 |
| | | | | 714/45 |
| 2013/0019248 A1* | 1/2013 | Yu | .............. | G06F 9/52 |
| | | | | 718/104 |
| 2015/0309551 A1* | 10/2015 | Yeager | ............... | G06F 11/3058 |
| | | | | 713/320 |
| 2019/0042513 A1* | 2/2019 | Fleming, Jr. | ........ | G06F 9/30145 |
| 2021/0318946 A1* | 10/2021 | Wouda | ................ | G06F 11/2635 |
| 2022/0100626 A1* | 3/2022 | Yasin | ....................... | G06F 9/542 |
| 2023/0088780 A1* | 3/2023 | Williams | ............... | G06F 9/342 |
| | | | | 710/20 |
| 2023/0089332 A1* | 3/2023 | Yoshimoto | ............ | G06F 9/3001 |
| | | | | 710/310 |
| 2023/0214224 A1* | 7/2023 | Horley | .................... | G06F 11/34 |
| | | | | 712/244 |
| 2023/0289279 A1* | 9/2023 | Williams | .............. | G06F 11/348 |
| 2024/0193070 A1* | 6/2024 | Strong | ............... | G06F 11/3466 |
| 2024/0296049 A1* | 9/2024 | Moran | ................. | G06F 9/3861 |
| 2024/0330146 A1* | 10/2024 | Cohen | ................. | G06F 11/3466 |

* cited by examiner

*Primary Examiner* — Shawn Doman
(74) *Attorney, Agent, or Firm* — Kilpatrick Townsend & Stockton LLP

(57)                    ABSTRACT

A system may include a processor having a pipeline, a plurality of counters, and trigger circuitry. The plurality of counters may mount events associated with processing instructions in the pipeline. Counters of the plurality of counters may count different events. The trigger circuitry may trigger a performance measurement for a first instruction after counters of the plurality of counters meet predefined values. Triggering the performance measurement may cause the plurality of counters to reset and then count events associated with processing the first instruction. In some implementations, the trigger circuitry may trigger the performance measurement based on an AND selection and/or an OR selection of multiple counters of the plurality of counters meeting predefined values.

17 Claims, 6 Drawing Sheets

*500* sample_count[26:0] =
    initial_period_value[26:0]
      ^ ( {16{random_enable}} & random_value[15:0]
       & ~({16{1'b1}} << random_mask_shift[3:0]) );

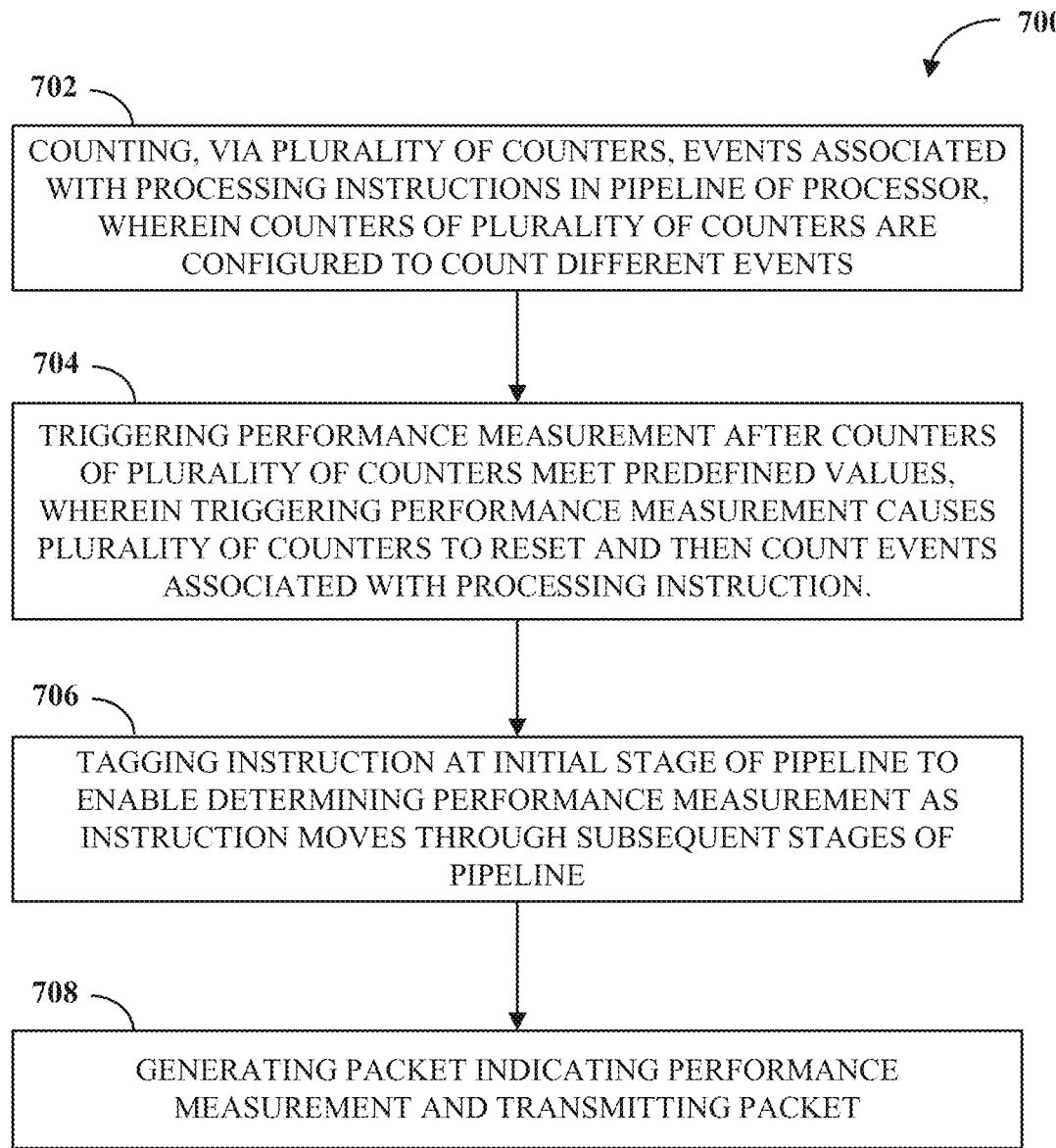

700

702
COUNTING, VIA PLURALITY OF COUNTERS, EVENTS ASSOCIATED WITH PROCESSING INSTRUCTIONS IN PIPELINE OF PROCESSOR, WHEREIN COUNTERS OF PLURALITY OF COUNTERS ARE CONFIGURED TO COUNT DIFFERENT EVENTS

704
TRIGGERING PERFORMANCE MEASUREMENT AFTER COUNTERS OF PLURALITY OF COUNTERS MEET PREDEFINED VALUES, WHEREIN TRIGGERING PERFORMANCE MEASUREMENT CAUSES PLURALITY OF COUNTERS TO RESET AND THEN COUNT EVENTS ASSOCIATED WITH PROCESSING INSTRUCTION.

706
TAGGING INSTRUCTION AT INITIAL STAGE OF PIPELINE TO ENABLE DETERMINING PERFORMANCE MEASUREMENT AS INSTRUCTION MOVES THROUGH SUBSEQUENT STAGES OF PIPELINE

708
GENERATING PACKET INDICATING PERFORMANCE MEASUREMENT AND TRANSMITTING PACKET

FIG. 7

MEASURING PERFORMANCE ASSOCIATED WITH PROCESSING INSTRUCTIONS BASED ON COUNTERS FOR DIFFERENT EVENTS

TECHNICAL FIELD

This disclosure relates generally to integrated circuits, and more specifically, to measuring performance associated with processing instructions.

BACKGROUND

Instruction tracing is a technique used to analyze the history of instructions executed by a processor core. The information collected may be analyzed to determine system performance and to help identify possible optimizations for improving the system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flow chart of an example of a process for measuring performance associated with processing instructions.

DETAILED DESCRIPTION

Figure 1:
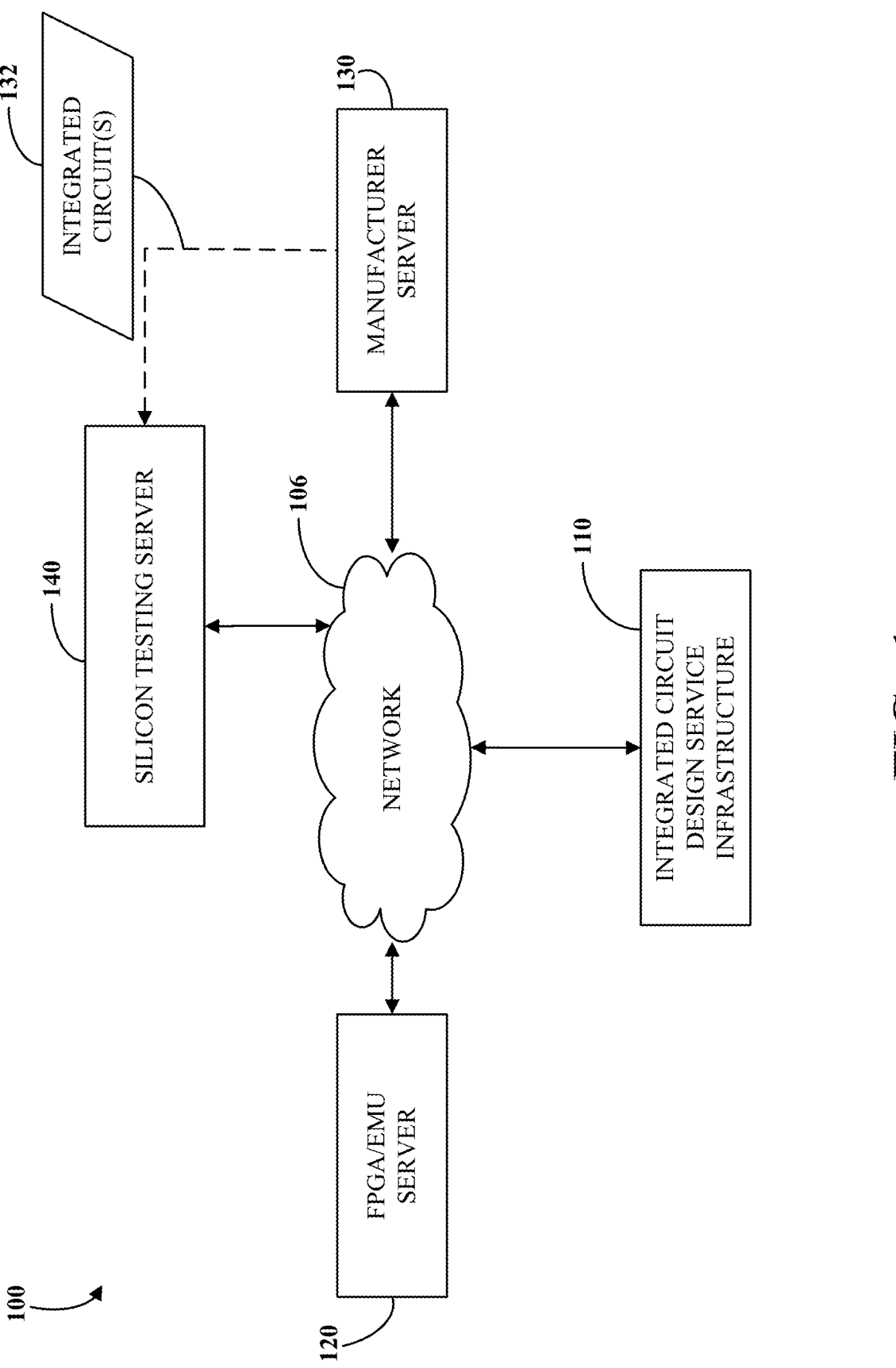
FIG. 1 is a block diagram of an example of a system for facilitating generation and manufacture of integrated circuits.

After a processor design is implemented in silicon, changing the design can be difficult. It is therefore desirable to evaluate how software can be changed to improve performance on the processor, such as by locating and removing software bottlenecks. To enable such evaluations, RISC-V microarchitectures may implement hardware performance monitors that give insights into the workings of the processor's pipeline. For example, hardware performance monitors implemented by a processor can be used by software to count events, such as cache level misses, translation lookaside buffer (TLB) level misses, branch mispredictions, instructions retired from the pipeline, and total cycles. However, utilizing hardware performance monitors to evaluate software can be challenging. For example, determining which instructions to sample, how often to sample, and/or what data to collect when sampling, can vary depending on the goals of the optimization and the design of the software utilized.

Implementations of this disclosure address problems such as these by implementing a per instruction performance event sampling (PIPES) system that utilizes a single set of counters to (1) flexibly trigger based on different events that might occur in a processor core, and (2) reset to enable per instruction performance event sampling based on the triggering. Some implementations may include a PIPES system comprising a plurality of counters and triggering circuitry. The plurality of counters may be used to count events associated with processing instructions in a pipeline (e.g., the software utilized). The events may be events that are tracked by hardware performance monitors implemented by a microarchitecture of the processor. For example, the events could include cache level misses, TLB level misses, branch mispredictions, instructions retired from the pipeline, and total cycles. Counters of the plurality of counters can count various ones of the different types of events. For example, a first counter could count instructions retired, and a second counter could count total cycles. The triggering circuitry may be used to trigger a performance measurement (e.g., a PIPES sample, or PIPES data) associated with processing a particular instruction (e.g., a sampled instruction, or sampling) after counters of the plurality of counters meet predefined values. For example, the triggering circuitry can trigger a performance measurement associated with an instruction after the first counter indicates X instructions retired, and/or the second counter indicates Y total cycles. The triggering circuitry can trigger the performance measurement based on an AND selection and/or OR selection of multiple counters of the plurality of counters. For example, there can be multiple AND_select signals generated based on the plurality of counters, such as:

```
AND_select[0] = 8'b1100_0001   // All of event[7] & event[6] &
cycles have reached their trigger
AND_select[1] = 8'b0110_0001   // All of event[6] & event[5] &
cycles have reached their trigger
AND_select[2] = 8'b0011_0001   // All of event[5] & event[4] &
cycles have reached their trigger
AND_select[3] = 8'b1000_1100   // All of event[7] & event[3] &
instret have reached their trigger
AND_select[4] = 8'b0100_1100   // All of event[6] & event[3] &
instret have reached their trigger
AND_select[5] = 8'b0010_1100   // All of event[5] & event[3] &
instret have reached their trigger
AND_select[6] = 8'b0001_1100   // All of event[4] & event[3] &
instret have reached their trigger
// event[7:3] form the plurality of event counters that are being
tracked in this example
```

All of these AND_select may be ORed together with a single OR_select to generate a final SAMPLE_trigger. When any one of them triggers, the sample is triggered.

Triggering the performance measurement may cause the plurality of counters to reset and then count events associated with processing the instruction in the pipeline (e.g., the sampled instruction). For example, the first counter can count A instructions retired, and/or the second counter can count B total cycles, as the instruction moves through stages of the pipeline (e.g., from an initial stages, such as a fetch stage, to a final stage, such as a retire stage). This may enable a flexible and/or efficient utilization of hardware resources implemented by the processor for the evaluation of software to improve performance.

To describe some implementations in greater detail, reference is first made to examples of hardware and software structures used to implement a system for measuring performance associated with processing instructions. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs.

The integrated circuit design service infrastructure 110 may include a register transfer level (RTL) service module configured to generate an RTL data structure for the integrated circuit based on a design parameters data structure. For example, the RTL service module may be implemented as Scala code. In another example, the RTL service module may be implemented using Chisel. In another example, the RTL service module may be implemented using a flexible intermediate representation for register transfer level (FIRRTL) compiler. In another example, the RTL service module may be implemented using Diplomacy. The RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output for specifying an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). The manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
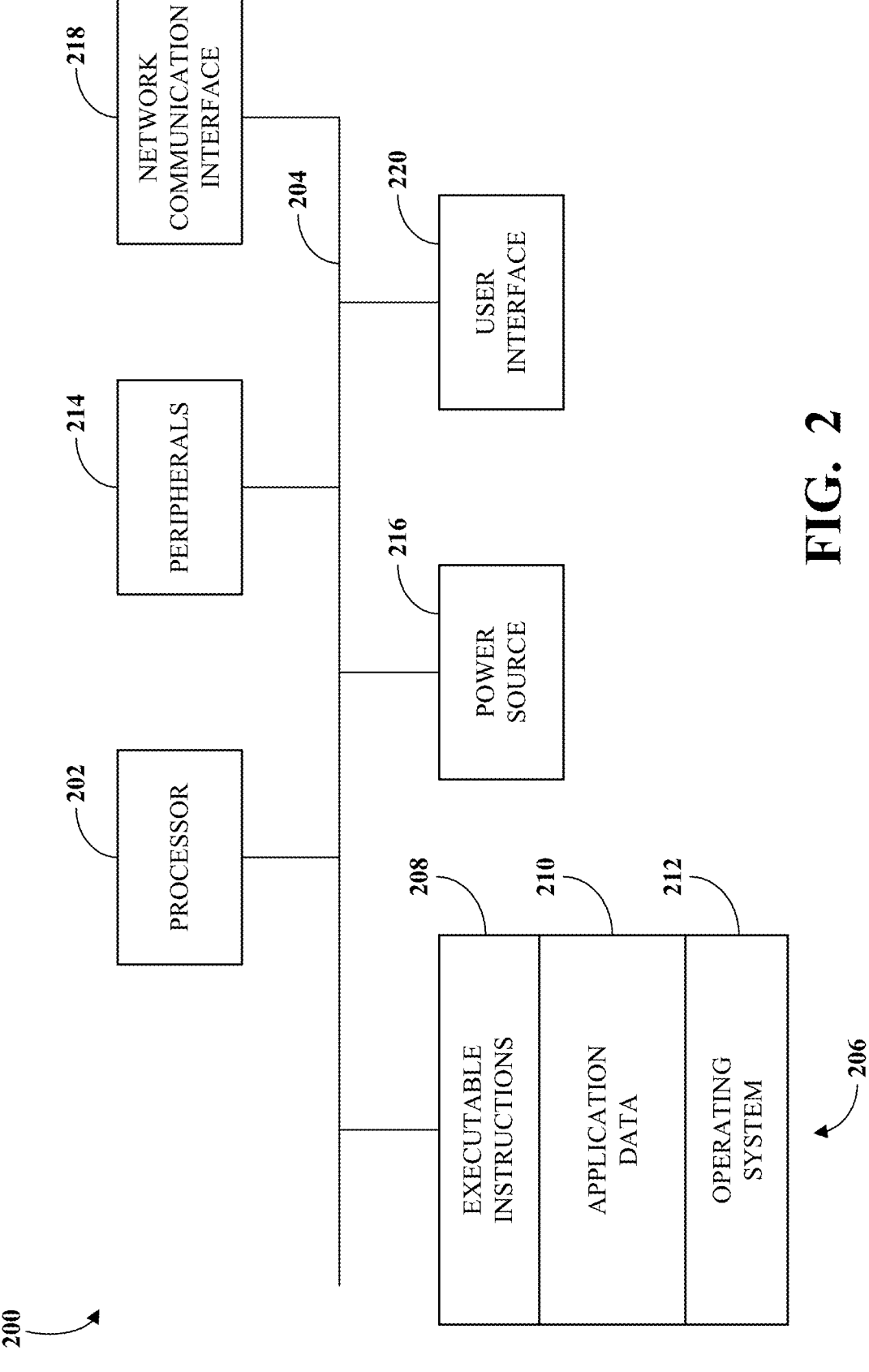
FIG. 2 is a block diagram of an example of a system for facilitating generation of integrated circuits.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device that may be used to implement the integrated circuit design service infrastructure 110, and/or to generate a file that generates a circuit representation of an integrated circuit design. The system 200 can include components or units, such as a processor 202, a bus 204, a memory 206, peripherals 214, a power source 216, a network communication interface 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random-access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a FIRRTL data structure (e.g., an intermediate representation (IR) data structure), an RTL data structure, a netlist, a GDSII data structure, or a combination thereof. In some implementations, the integrated circuit may take the form of a field programmable gate array (FPGA), an application specific integrated circuit (ASIC), a system on a chip (SoC), or some combination thereof. A computer may process the circuit representation in order to program or manufacture an integrated circuit, which may include programming an FPGA or manufacturing an ASIC or an SoC. In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
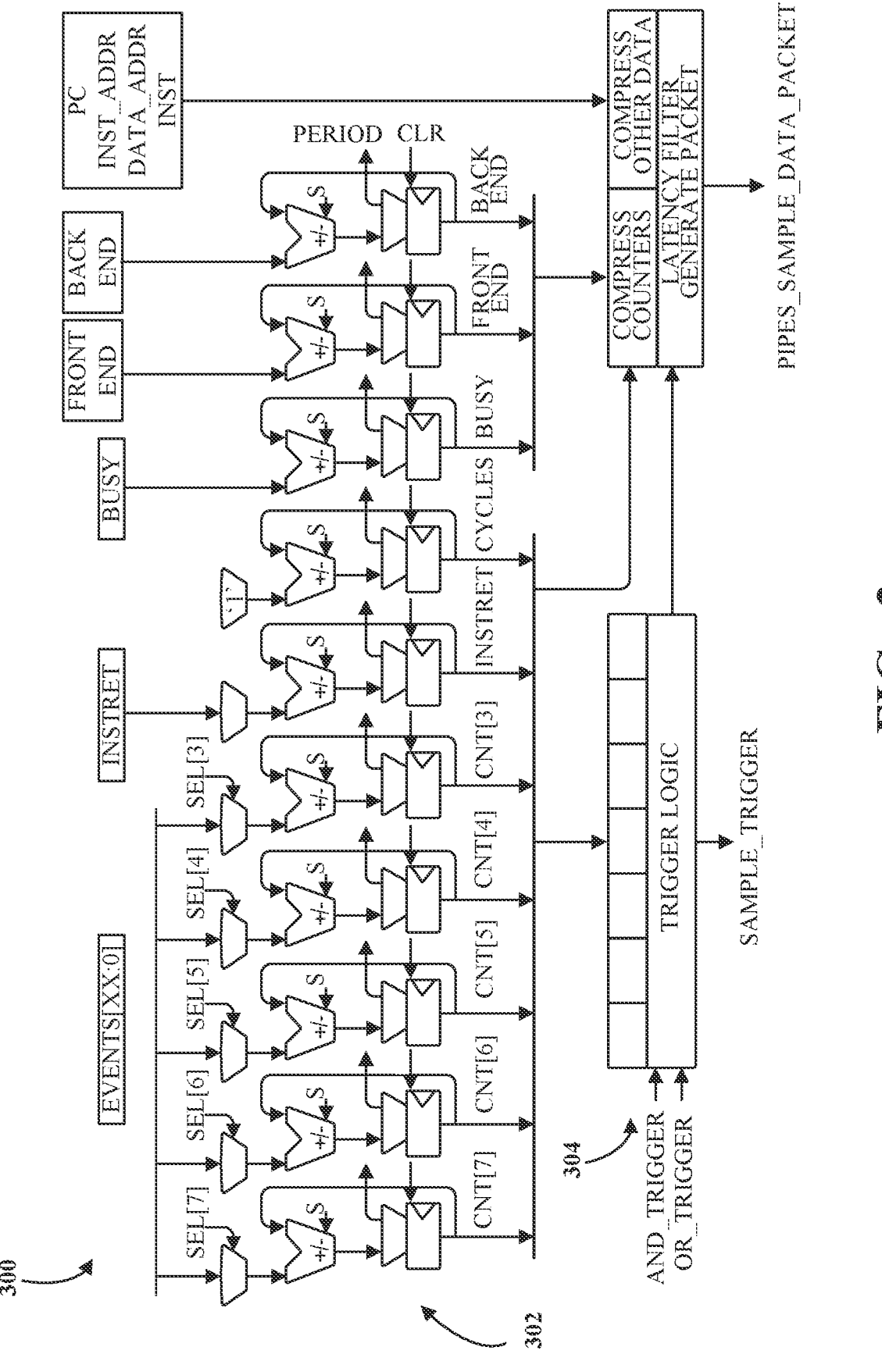
FIG. 3 is a block diagram of an example of a system for measuring performance associated with processing instructions.

FIG. 3 is a block diagram of an example of a PIPES system 300 for measuring performance associated with processing instructions (e.g., trigger basis and sample data shared counters). The PIPES system 300 may implement a per instruction performance event sampling system that utilizes a plurality of counters 302 to (1) flexibly trigger based on different events that might occur in a processor core, and (2) reset to enable per instruction performance event sampling based on the triggering. The PIPES system 300 may include the plurality of counters 302 and triggering circuitry 304. The plurality of counters 302 may be used to count events associated with processing instructions in a pipeline (e.g., software being optimized). The events may be events that are tracked by hardware performance monitors implemented by a microarchitecture of the processor. For example, the events could include cache level misses, TLB level misses, branch mispredictions, instructions retired from the pipeline, and total cycles. Counters of the plurality of counters 302 can count various ones of the different types of events. For example, a first counter could count instructions retired (e.g., INSTRET), and a second counter could count total cycles (e.g., CYCLES).

The triggering circuitry 304 may be used to trigger a performance measurement associated with processing a particular instruction (e.g., a sampled instruction, or sampling) after counters of the plurality of counters 302 meet predefined values. For example, the triggering circuitry 304 can trigger a performance measurement associated with an instruction after the first counter (e.g., INSTRET) indicates X instructions retired, and/or the second counter (e.g., CYCLES) indicates Y total cycles. The triggering circuitry 304 can trigger the performance measurement based on an AND selection and/or OR selection of multiple counters of the plurality of counters 302. For example, there can be multiple AND_select signals generated based on the plurality of counters 302, which may be ORed together with a single OR_select to generate a final SAMPLE_trigger. Triggering the performance measurement may cause the plurality of counters 302 to reset and then count events associated with processing the instruction in the pipeline (e.g., the sampled instruction). For example, the first counter can count A instructions retired, and/or the second counter can count B total cycles, as the instruction moves through stages of the pipeline (e.g., from an initial stages, such as a fetch stage, to a final stage, such as a retire stage). This may enable a flexible and/or efficient utilization of hardware resources implemented by the processor for the evaluation of the software to improve performance.

In some implementations, the plurality of counters 302 may be configured to count-down to trigger the performance measurement. After the performance measurement is triggered, the plurality of counters 302 may be reset to count-up to generate the performance measurement. This may enable a flexible and/or efficient utilization of hardware resources implemented by the processor for the evaluation of software to improve performance.

Figure 4:
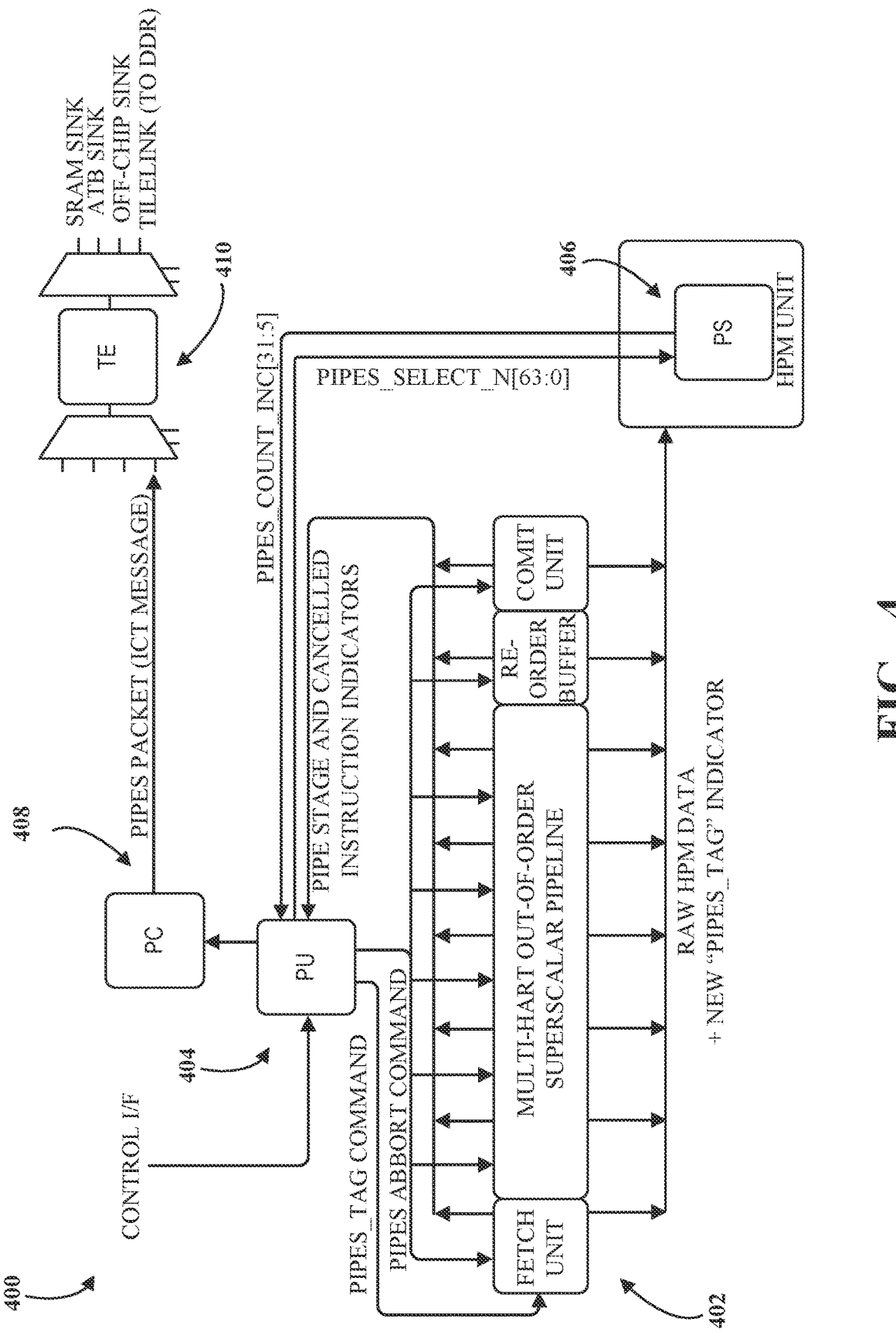
FIG. 4 is a block diagram of an example of a system including a pipeline and measuring performance associated with processing instructions through the pipeline.

FIG. 4 is a block diagram of an example of a system 400 including a pipeline 402 and a PIPES system for measuring performance associated with processing instructions through the pipeline 402. The PIPES system may include a PIPES unit 404, a PIPES selectors 406, and PIPES compressor 408. In some implementations, the PIPES system could comprise circuitry of the PIPES system 300 of FIG. 3. For example, the PIPES selectors 406 may include the plurality of counters 302 and/or the triggering circuitry 304. The PIPES selectors 406 may utilize circuitry associated with hardware performance monitor (HPM) unit implemented by a microarchitecture of the processor, including one or more hardware performance monitors used to track events.

The PIPES unit 404 may configure the PIPES selectors 406 and/or the PIPES compressor 408. The PIPES selectors 406 (e.g., via a plurality of counters, such as the plurality of counters 302) may be used to count events associated with processing instructions in the pipeline 402. The events may be events that are tracked by hardware performance monitors implemented by the HPM unit. For example, the events could include cache level misses, TLB level misses, branch mispredictions, instructions retired from the pipeline, and total cycles. The PIPES selectors 406 (e.g., via a counters of the plurality of counters) can count various ones of the different types of events. For example, a first counter could count instructions retired, and a second counter could count total cycles.

The PIPES selectors 406 (e.g., via triggering circuitry, such as the triggering circuitry 304) may be used to trigger a performance measurement associated with processing a particular instruction (e.g., a sampled instruction) after counters of the plurality of counters meet predefined values. For example, the PIPES selectors 406 (e.g., via the triggering circuitry) can trigger a performance measurement associated with an instruction after the first counter indicates X instructions retired, and/or the second counter indicates Y total cycles. The PIPES selectors 406 (e.g., via the triggering circuitry) can trigger the performance measurement based on an AND selection and/or OR selection of multiple counters of the plurality of counters. For example, there can be multiple AND_select signals generated based on the plurality of counters, which may be ORed together with a single OR_select to generate a final SAMPLE_trigger. Triggering the performance measurement may cause the plurality of counters to reset and then count events associated with processing the instruction in the pipeline 402 for the sampled instruction. For example, the first counter can count A instructions retired, and/or the second counter can count B total cycles, as the instruction moves through stages of the pipeline 402, such as a fetch stage (e.g., fetch unit) to an instruction retire stage (e.g., commit unit). This may enable a flexible and/or efficient utilization of hardware resources implemented by the processor for the evaluation of software to improve performance.

In some implementations, the PIPES unit 404 (e.g., via tagging circuitry) may tag the sampled instruction at the fetch stage of the pipeline 402, such as by setting a bit associated with the instruction. Tagging the instruction may enable tracking the instruction through the pipeline 402 for determining the performance measurement as the instruction moves through stages of the pipeline (e.g., decode, execute, reorder, and commit).

In some implementations, the PIPES unit 404 generate an indication to abort the performance measurement of an instruction, and/or may receive an indication that cancels the performance measurement of the instruction. For example, the PIPES unit 404 may generate and transmit the indication to a stage of the pipeline 402 to abort the performance measurement of the instruction at the particular stage. This may result in stopping counts by the plurality of counters (e.g., associated with the performance measurement) based on the indication. In another example, the PIPES unit 404 may receive an indication from a particular stage of the pipeline 402 that cancels the performance measurement of the instruction. This may also result in stopping counts by the plurality of counters (e.g., associated with the performance measurement) based on the indication.

The PIPES compressor 408 may include packet generation circuitry. The packet generation circuitry may generate packets indicating the performance measurement. In some implementations, the packets may be compressed when transmitted. For example, the packets may include counts, from the plurality of counters, represented in a format including a mantissa and an exponent (e.g., similar to IEEE floating point). In some implementations, a length of the packet may be variable based on a selection of counts from the plurality of counters. For example, selecting fewer counts to report may result in a smaller packet (e.g., fewer bits), whereas selecting more counts to report may result in a larger packet (e.g., more bits). Packets from the PIPES compressor 408 may be output from the system 400 via a trace encoder interface 410.

Thus, the PIPES system may provide raw data to enable annotation of software (e.g., C source-code) with micro-architectural latency data either during execution or after an application has completed. The hardware may store the raw data to enable a software tool to back-annotate to the assembly level and C-source code.

Usage of the PIPES system may be non-intrusive to software. To enable back-annotation, code may be compiled with debugging symbol tables so that post-processing software can function correctly. However, no changes to the application source code are required.

The PIPES system may operate using a sampling based approach to reduce the amount of data to be collected. The PIPES system does not attempt to collect data for every instruction on every cycle.

Instruction sampling by the PIPES system may have less than a 1% performance impact on the execution of software while it is enabled. The PIPES system may generate data to be recorded for later analysis. In some cases, PIPES data may be transmitted to a memory via a dedicated trace port. For systems that record PIPES data to external memory, there may be associated with sharing that resource with the application being run. For systems without an external memory, any degradation in performance may come from sharing internal memory bandwidth and capacity.

In some implementations, PIPES samples may be compressed as they are collected (e.g., before being sent out by the PIPES unit 404). For example, a typical sample size may be around 256-bits. For RISC-V 64-bit instructions (RV64I), a largest possible sample packet could be 117-bytes of which 88-bytes are sample data values.

In some implementations, to keep implementations simple, the PIPES system may define that only one instruction in the pipeline 402 can be tagged to collect a sample at any time.

In some implementations, PIPES is able to collect data from mis-speculated instructions. Since mis-speculated instructions result in no architectural change in state, and are not committed, they can be difficult to back-annotate to the application source-code.

The PIPES system may be usable by any RISC-V pipeline, such as the pipeline 402. For example, the PIPES system may be utilized in out-of-order superscalar micro-architectures where performance bottlenecks might not be architecturally visible. For superscalar implementations, the PIPES system can sample any of the instructions in a group that is being fetched, issued, and retired simultaneously. The PIPES system may work in single-HART and multi-HART implementations and numerous instructions set architectures (e.g., RV32E, RV32I, RV64I, or RV128I).

Capturing precise event counts for a sampled instruction may include (1) associating them with the instruction that caused the issue ("caused-by"), or (2) associating them with instructions that suffer the consequences ("suffer-from").

Store instructions may be complicated, e.g., if they miss in the data-cache they can be committed/graduated/retired into a cache-line based store buffer that is drained much later, potentially hundreds or thousands of cycles in the future. These buffers can contain entries for multiple store instructions, only one of which might be the tagged instruction. When a new instruction is fetched and determined to be a store it might be blocked because the store queue is full because of that earlier one. To generate a precise "caused-by" count, the PIPES sample may be held until the tagged store buffer entry is drained.

Control-transfer instructions (CTI's) may also be complicated, e.g., if the CTI was mis-predicted by the branch prediction hardware it will have no consequence for that instruction which can commit/graduate/retire regardless of the prediction that was made for it. However, subsequent instructions coming down the pipeline 402 in the predicted direction may have to be flushed so the effect may be felt by subsequent instructions which "suffer-from" the branch mis-prediction effects. There can be multiple branch mis-predict resolutions before any instruction so a sample on a branch may involve the PIPES keeping that record until effects have been determined.

In some implementations, the PIPES system may count in a "suffers-from" manner. For example, when a sample is triggered, events may be counted as long as that instruction is in the pipeline 402. Thus, an instruction can be reported as being canceled because of a misprediction even if it is not a CTI type. It "suffers-from" the effect of an earlier CTI misprediction. Similarly for non-store instructions which might not be able to be issued because the backend of the pipeline 402 is stalled waiting for that earlier store to drain from the queue. They "suffer-from" the effect of the much earlier store.

The HPM counters may include a number of performance counters (e.g., CYCLE, INSTRET, and HPMCOUNTER3 to HPMCOUNTER31). The PIPES system may include CYCLE and INSTRET available by default as a trigger basis (e.g., for the triggering circuitry 304). Instead of using HPMCOUNTER registers (e.g., from the HPM unit), the PIPES system may utilize its own set of event counters. The number of event counters that can be used as a trigger basis may be independent of the number of HPMCOUNTER registers that are provided by the implementation.

Counters of the PIPES system (e.g., the plurality of counters 302) differ from conventional architectural registers in that they have a dual purpose. They are used as the trigger basis, determining when a sample is captured by PIPES system. They are also used to capture the activity that occurs during the execution of the sampled instruction. They may be reset to zero when the sampling is started and preset to a user-configurable value after the sample is collected. Any of the implementation's counters can be used as the trigger basis and/or to count sample events.

When CYCLE is used as a trigger basis, the samples may be captured on a regular period selectable by the user. The sampling period may be selected to trade-off visibility of performance issues against performance impact that might occur from data being collected. Statistically, over a long run-time, a CYCLE sampling based approach may have recorded data from the slowest executing regions of code. The slower the execution of a region of code, the longer the processor will idle at that location, and the greater the probability of a sample being collected.

When INSTRET is used as a trigger basis, the samples may be captured every user specified number of instructions. In this case, slower regions of code would not have a greater probability of being sampled.

When event counters (e.g., HPMCOUNTER3 to HPM-COUNTER31) are used as a trigger basis, sampling may be based on the events that map to them. For example, different implementations may have different capabilities on what these events may include.

In some implementations, the PIPES system may restrict a minimum trigger period for CYCLE and/or INSTRET counters (e.g., to the value 0xFF). This may address, for example, sampling at a higher frequency quickly saturating sample data collection hardware. The PIPES system may also include additional event counters as described herein, such as FRONTEND, BACKEND, and/or BUSY.

In some implementations, the PIPES system may have at least two control selects: (1) an AND selection (e.g., AND_trigger) in which all selected bits must be '1' to trigger a sample, and (2) and an OR selection (e.g., OR_trigger) in which any selected bits with value of '1' may trigger a sample. A sample may be triggered (e.g., by the triggering circuitry 304) when either the AND_trigger or the OR_trigger is set.

For example, bit [0] could correspond to CYCLES; bit [1] could be reserved; bit [2] could correspond to INSTRET; and bits [3]-[31] could correspond to EVENT_COUNT [3-31]. Example 1: AND_select: 4'b0000; OR_select: 4'b0000; samples cannot be triggered—PIPES is effectively disabled. Example 2: AND_select: 4'b0000; OR_select: 4'b0101; sample triggered when either CYCLES or INSTRET increments over their respective configured values. Example 3: AND_select: 4'b0101; OR_select: 4'b0000; sample is triggered when both CYCLES and INSTRET increments over their respective configured values. Example 4: AND_select: 4'b1100; OR_select: 4'b0001; sample is triggered when both event [3] and INSTRET increments over their respective configured values or CYCLES increments over its configured value.

In some implementations, the PIPES system may implement filtering to enable samples to be limited to those instructions which have a latency greater than a minimum value. In this case, a maximum value that can be configured is 0xFF.

In general, it may be useful to indicate that an instruction has been sampled even if nothing unexpected happens for that particular execution of this instruction. However, when the sample data collection hardware is being saturated the filter can be used such that more useful samples are captured at the expense of dropping data on those that were executed normally.

Samples may be collected even when the latency filter is enabled, but samples for instructions with a latency less than the filter value may be simply discarded. This can be detected while post-processing by checking a sequence ID between successive packets.

In some implementations, triggering the performance measurement may include randomizing a selection of the instruction using a pseudo random number generator. The PIPES system may include a configurable randomization capability to prevent repeated sampling on the same instruction. This feature can be turned on/off for each of the trigger counters (e.g., the triggering circuitry 304) and the degree of randomization may also be configurable independently for each counter.

Figures 5, 6:
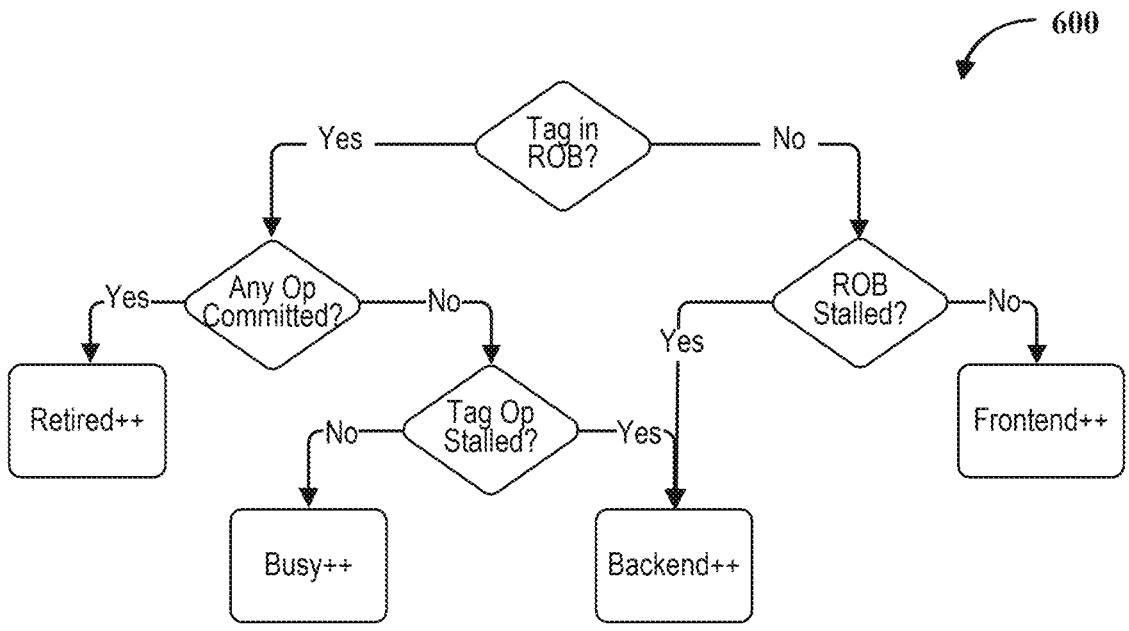
FIG. 5 is an example of code associated with randomization for measuring performance associated with processing instructions.
FIG. 6 is a flow chart of an example of a process for generating counters.

To configure the degree of randomization, a mask shift value may specify how many of the least significant bits should be randomized. For example, with additional reference to FIG. 5, each implemented sample period countdown may be set to an initial value according to the code 500 which may be used by the PIPES system.

The random_value is masked then XOR-ed into the lower-order bits of the sample period countdown. To recreate any sequence, a user may be given control over an initial seed value. This seed value may be set before the PIPES system is enabled (e.g., the PIPES unit 404). A linear-feedback shift register (LFSR) may be free running when random_enable and PIPES enable are set.

A random number may perturb the counter by a fraction of the maximum value. The random mask shift amount may be limited to 4-bits. Thus, the bottom 16-bits of the countdown value can be randomly perturbed.

The random number may be XOR-ed into the sample period countdown and not added, resulting in smaller or larger values. Thus, the actual sample point can be earlier and/or later than the period specified in the control register.

The sample trigger can count down from its initial value to zero at which point it can trigger a sample event. It can then be loaded with a new value generated in the same way and a next countdown can begin while a current sample is being taken.

In some cases, it is possible for a next sample trigger to reach zero before a previous sample has been collected. For example, a sample may be triggered on a load that has a page miss in the TLB and has to perform a hardware table walk. In this case, the next CYCLES sample may be triggered before the current sample has been recorded. In cases in which the PIPES system only supports a single sample in-flight at any time, the new request may be discarded.

In some implementations, the PIPES system may include a separate count of the number of discarded requests. When the number of discarded requests reaches the configured maximum then the current sample is aborted. A sample record can be generated with data available at that point along with an indication that the sample was aborted. The hardware control logic can send a sample_abort signal to units that could be in the process of capturing the sample data and reset the discarded request counter. In some implementations, an interrupt can be generated for the abort process allowing software to perform further clean-up as necessary.

As described herein, the PIPES system can count cycles (e.g., CYCLES) and instructions retired (e.g., INSTRET) for other hardware threads on the same pipeline. The PIPES system may include security features, utilize RISC-V features, and/or other security features. For example, performance delegation features may be utilized in which privileged software can control which counters (e.g., the plurality of counters 302) and events are visible to software at different privilege levels. In some implementations, event enables may be utilized to disable event visibility as required. In some implementations, the PIPES system may be limited to accessing only those values it has been configured with.

When a SAMPLE_trigger event has been generated, the PIPES system can switch the counters (e.g., the plurality of counters 302) over to sample events by clearing the counters to zero and switching from decrement to increment mode (e.g., reset).

One of the next instructions being fetched can be selected at random as the tagged sample. On simultaneous multithreading (SMT) machines, there may be different hardware threads in the machine at the same time, but normally one thread is being fetched in any one cycle. It is possible that no instructions are being fetched in the cycle when the SAMPLE_trigger goes high. These cycles may be counted as frontend stall cycles.

The PIPES_TAG flag can travel along with the instruction through the processor pipeline (e.g., the pipeline 402) so that various data can be sent back to the PIPES system to record.

In some cases, indexed vector memory ops can involve more fields to track data accesses being made: VTYPE (e.g., LMUL, SEW, VMA, VTA); SCALAR-BASE-ADDR; VECTOR-CONST-STRIDE-VALUE (optional, from scalar register); VECTOR-MASK-REGISTER-VALUE (optional); VECTOR-REGISTERS [0-7] (1,2,4,8 based on opcode and LMUL). These additional data values may involve an increase in the PIPES system's packet size.

The counter, total cycles, can be updated every cycle during a sample and can be used to record the total latency for an instruction through the pipeline (e.g., the pipeline 402). Three new signals: frontend stalled, backend stalled, and busy (not retiring) may be used with the counters. They may be generated according to a process 600 shown in FIG. 6. Note: retired cycles value might not be stored in the PIPES packet, it can be calculated by: Retired_cycles=Total_cyles−(Busy+Frontend+Backend). The value of INSTRET can be stored in the PIPES packet. INSTRET can count the number of other instructions retired while a tagged instruction is in the pipeline, rather than the number of cycles in which any instruction was retired.

These signals can involve a new block to be incorporated into the pipeline. The process 600 shown in FIG. 6 may involve knowledge of the PIPES_TAG instruction reaching the re-order buffer (ROB) (or equivalent) in the processor pipeline.

In some implementations, there can be at least hundreds of selectable events in any given processor pipeline implementation. To save wiring, PIPES selectors may be used in the HPMCOUNTER unit. Each event selector can be 64-bits in size. In some cases, to save wiring, a narrow bus can be used to send the event select controls over multiple cycles. In some cases, the selected events can be single-bit values, and in some cases, some can be multi-bit, such as INSTRET.

In that case, the return signals coming back may be the maximum number of bits required.

Alternatively, a subset of the events can be made available for PIPES system and only those sent back to the PIPES system itself for selection. In this case, no additional logic would be needed inside the HPMCOUNTER logic block (e.g., everything can reside in the PIPES unit 404).

Samples can start counting from zero and record samples for the instruction.

A PIPES_TAG can be applied to instructions at fetch time. It is possible that the instruction may be speculative, and it could be canceled because of a branch direction or target address misprediction at any time before it is committed. When a tagged instruction is canceled, the PIPES unit 404 can be updated.

Instructions can be canceled for other reasons such as a fence instruction (e.g., fence.i) or control status register (CSR) accesses. The reason for the instruction cancellation can be returned to the PIPES unit 404. As different microarchitectures can have different possible reasons, a token can be stored in a status field of the packet. The identification fields in the PIPES_ID packet can uniquely identify any implementation so this encoded byte can be decoded based on that.

When the instruction is finally committed it can inform the PIPES unit 404 so that final count values can be recorded and forwarded to the PIPES compressor 408 and forwarded to an existing trace encoder as an in-circuit trace (ICT) message. Connecting to the unit can mean that no new port is has to come out of the core.

In some implementations, the PIPES system functionality can be broken into separate components: interface with processor pipeline (to collect profile data); control/data interfaces; internal structures; output interface to store profile data; and/or interface to existing hardware for performance monitoring. FIG. 4 illustrates how the PIPES system is integrated into an existing pipeline (e.g., the pipeline 402).

The control interface is a read/write memory-mapped set of registers. Some registers may be optional and implementation dependent. In some implementations, RISC-V 32-bit implementations can access higher 32-bits of internal registers by adding a constant 0x100 word-offset.

In some implementations, supervisor code can configure PIPES to record samples for multiple contexts hence the need for the context field to disambiguate between them. Any time a new context has PIPES enabled the supervisor software can generate an ID packet. The supervisor code may follow a procedure to context switch between multiple threads with PIPES sampling enabled.

Supervisor code is not required to use the architectural values for context-id or hart-id but can instead program any unique values that it chooses-they can be mapped back to the correct context-id and hart-id in post-processing software.

Software can reconfigure the reference address values at any time, but the new values might not take effect until the corresponding bit in the control register is set. This also has the side effect of generating a SYNC packet so that values in subsequent packets can be determined.

In some implementations, the PIPES system may specify three reference address values. One is dedicated for PC (VA) values which is used to compress the program counter (PC) of the instruction being sampled. Comparison hardware XOR's the current PC against the reference value and does not store any upper bytes that have a value of 0x00. The PC field in the sample packet holds a variable number of bytes from one to 16. In some implementations, a full PC value can be encoded. If the PC value is encoded in fewer bytes than required for XLEN then profiling software can determine that the upper bytes come from the reference value.

In some implementations, the data packet can have an optional field used to store any addresses used by the instruction being sampled. This address could be a control transfer target address stored relative to the reference PC value. There can be two more reference addresses available for the data addresses used for load, store, amo, and/or fence instructions. Software can preconfigure these with a stack and global or thread reference value. Hardware can compare against both of these addresses in parallel and select the reference which gives the better compression. The reference that was selected can be recorded in the sample packet so that profiling software can reconstruct the correct value.

In some implementations, there may be a set of at least five counters: Total Cycles (Total number of cycles taken by sampled instruction to execute in the processor pipeline); Frontend Cycles (Number of cycles that sampled instruction takes in the frontend of the processor pipeline. Frontend is defined as anything before the sampled instruction reaches the reorder buffer (or equivalent)); Backend Cycles (Number of cycles that sampled instruction was stalled because of the backend of the processor pipeline. This can occur even before the sampled instruction reaches the reorder buffer (or equivalent)); Retired Insts (Number of other instructions that were retired in the processor pipeline during execution of sampled instruction); and Busy Cycles (Number of cycles where nothing was retired during execution of sampled instruction). Retired Insts can count the number of instructions and not cycles. The number of Retired Cycles can be calculated using the formula: Retired_Cycles=Total_Cycles−(Frontend_Cycles+Backend_Cycles+Busy_Cycles).

Some RISC-V microarchitectures may include hardware performance monitors that can give detailed insight to the workings of the pipeline. These internal microarchitectural details can be useful in conjunction with the PIPES hardware in order to further refine the data and focus on a specific problem. For example, for the "Frontend" category there could be hardware performance monitors available that count cycles of I$ blocked; I$ miss; ITLB miss; IJTP mispredict; IFU stalls; and RAS mispredict.

PIPES can include an optional ability to capture at least an additional 29 microarchitectural signals/events in a similar manner as used by the hardware performance monitors. Sample data counters can be implemented using the same 27-bit saturating counters as those used for the trigger mechanism. Counters can be reset to 0 when a sample is initiated and stop when the instruction commits or is canceled. In some implementations, these 27-bit counter values can be compressed by PIPES to 0/8/16-bit lengths when generating a packet that will subsequently be stored by the sample data collection hardware.

Data values of '0' might not be stored in the generated packet (e.g., their absence may be recorded by the value of '0' in a corresponding bit of the data_en field). The data_len field in the header can indicate if the packet contains an 8-bit integer or 16-bit packed version of the 27-bit counter. A value of 0xFFFF can indicate that the counter has overflowed.

PIPES Event Select Control. A PIPES Event Select Control can be configured like the HPMCOUNTERs. event_select_en[31:3] can enable optional microarchitectural counters; any given implementation may provide all/some/none of these counters; events may be enabled and disabled during actual sampling runs. event_select_ctrl_N[63:0] can control what is selected for any event; N is in range [5 . . .

31] but any given implementation may provide all/some/none; sampled events may be dynamically changed during actual sampling runs. These 64-bit registers can be defined to use the same format as the event selectors for the HPM unit in this microarchitecture. For example, [63:56]=overflow and filter control bits; [55:8]=event mask; [7:0]=event class. In some implementations, the hardware might not record these 64-bit select values automatically in the sample packets. Software can initiate a SELECT packet through the control interface so that those that are enabled can be entered into the data stream.

Status and Sample Data Interface. Status and sample data values can be made available through a read-only memory mapped register interface. In some implementations, the number of event counters and data samples that are available in an implementation can be identical. In some implementations, some of the event counters can be used as a sample basis and to collect a different set as sample data (e.g., they can have independent controls).

PIPES Data Packet Format. In some implementations, a PIPES Sample Packet Data can record if the instruction was committed or was canceled because of a mis-speculation. In some implementations, for non-self-modifying code, the type of instruction can be determined by post-analysis of the recorded PC value. However, for JIT applications the instruction being executed can also be recorded so that its type can be determined.

PIPES SYNC Packet Format. In some implementations, e.g., when initiated by software, PIPES can generate a packet that records the reference address values that are used to compress the PC and ADDR in the data packets. This packet can be generated by hardware: if there is a packet currently being generated then immediately after it; if there is back pressure from the packet collection funnel then immediately after that clears. The number of bytes for the reference addresses might not be fixed. The hardware can employ sign-extension to shorten the reference addresses if possible. When shorter reference addresses are present in the packet, software can determine that there is a sign-extension to fill remaining XLEN bits for this implementation.

PIPES ID Packet Format. When initiated by software, PIPES can generate a packet that records unique ID values for the core. For example, the combination of "hart-id" and "context-id" can be used to uniquely identify cores and software threads in subsequent packets. This packet can be generated by hardware: if there is a packet currently being generated then immediately after it; if there is back pressure from the packet collection funnel then immediately after that clears.

PIPES Select Packet Format. When initiated by software, PIPES can generate a packet that records the 64-bit select values for all those select registers that have been enabled by the select_N register. This packet can be generated by hardware: if there is a packet currently being generated then immediately after it; if there is back pressure from the packet collection funnel then immediately after that clears.

Counter Compression. PIPES can use 27-bit counters that count-up when used to sample data and count-down when used as a trigger. The counters can saturate at the value of all 1's when counting up and all 0's when counting down. The PIPES data packet can hold these counters using compression: 0-bits: Data value of zero so field is marked as absent in the packet. 8-bits: Data contains an 8-bit integer in the range 0-255. 16-bits: Data is represented in {exponent[3:0], mantissa[11:0]} format. Exponent of 0x0=denormal representation (mantissa[11:0] holds integer value; there is no implied '1' to the left of the lower 12-bits; values are right aligned in mantissa field; pseudo-verilog:value=mantissa [11:0]). Non zero exponent=normal representation (exponent holds the most significant bit position (0-indexed) with a bias of minus-11; most significant bit is implied and not stored in mantissa; next 12 most significant bits are stored in mantissa field; data-value=2^(exponent+11)*1·mantissa [11:0]; pseudo-verilog: value={1'b1, mantissa[11:0]}<<(exponent-1)). Value of 0xFFFF represents overflow. Rounding: above text rounds towards zero. Possible rounding options: +inf, −inf, 0, nearest ties to even, nearest ties away from 0.

FIG. 7 is a flow chart of an example of a process 700 for measuring performance associated with processing instructions. The process 700 can be performed, for example, using the systems, hardware, and software described with respect to FIGS. 1-6. The steps, or operations, of the process 700 or another technique, method, process, or algorithm described in connection with the implementations disclosed herein can be implemented directly in hardware, firmware, software executed by hardware, circuitry, or a combination thereof. Further, for simplicity of explanation, although the figures and descriptions herein may include sequences or series of steps or stages, elements of the methods and claims disclosed herein may occur in various orders or concurrently and need not include all of the steps or stages. Additionally, elements of the methods and claims disclosed herein may occur with other elements not explicitly presented and described herein. Furthermore, not all elements of the methods and claims described herein may be required in accordance with this disclosure. Although aspects, features, and elements are described and claimed herein in particular combinations, each aspect, feature, or element may be used and claimed independently or in various combinations with or without other aspects, features, and elements.

At step 702, a system may count, via a plurality of counters, events associated with processing instructions in a pipeline of a processor. Counters of the plurality of counters may be configured to count different events. For example, the PIPES system 300 may count, via the plurality of counters 302, events associated with processing instructions in a pipeline of a processor. Counters of the plurality of counters may be configured to count different events, such as cache level misses, TLB level misses, branch mispredictions, instructions retired from the pipeline, and total cycles.

At step 704, the system may trigger a performance measurement for a first instruction after counters of the plurality of counters meet predefined values. Triggering the performance measurement may cause the plurality of counters to reset and then count events associated with processing the first instruction. For example, the triggering circuitry 304 may trigger a performance measurement after counters of the plurality of counters meet predefined values.

At step 706, the system may tag the first instruction at an initial stage of the pipeline to enable determining the performance measurement as the first instruction moves through subsequent stages of the pipeline. For example, the system may tag the first instruction at a decode stage of the pipeline 402 to enable determining the performance measurement as the first instruction moves through subsequent stages of the pipeline, such as decode, execute, reorder, and commit stages.

At step 708, the system may generate a packet indicating the performance measurement. The system may also transmit the packet indicating the performance measurement to enable evaluation of software running on the processor. For example, the system may generate an ICT message indicating the performance measurement. The system may also transmit the packet indicating the performance measurement to a trace encoder.

Some implementations may include a method, comprising: counting, via a plurality of counters, events associated with processing instructions in a pipeline of a processor, wherein counters of the plurality of counters are configured to count different events; and triggering a performance measurement for a first instruction after counters of the plurality of counters meet predefined values, wherein triggering the performance measurement causes the plurality of counters to reset and then count events associated with processing the first instruction. In some implementations, the method may include triggering the performance measurement based on an AND selection of multiple counters of the plurality of counters meeting predefined values. In some implementations, the method may include generating a packet indicating the performance measurement, wherein the packet includes one or more counts, from the plurality of counters, represented in a format including a mantissa and an exponent. In some implementations, the method may include generating a packet indicating the performance measurement, wherein a length of the packet is variable based on a selection of one or more counts from the plurality of counters. In some implementations, the method may include tagging the first instruction at a fetch stage of the pipeline to enable determining the performance measurement as the first instruction moves through subsequent stages of the pipeline. In some implementations, the method may include transmitting, from a stage of the pipeline, an indication that the first instruction has been canceled; and stopping counts from the plurality of counters based on the indication. In some implementations, triggering the performance measurement may include randomizing a selection of the first instruction using a pseudo random number generator. In some implementations, the plurality of counters are configured to count-down to trigger the performance measurement then count-up to generate the performance measurement. In some implementations, the events include cache level misses, TLB level misses, branch mispredictions, instructions retired from the pipeline, and total cycles.

Some implementations may include an apparatus, comprising: a processor including pipeline; a plurality of counters configured to count events associated with processing instructions in the pipeline, wherein counters of the plurality of counters are configured to count different events; and trigger circuitry configured to trigger a performance measurement for a first instruction after counters of the plurality of counters meet predefined values, wherein triggering the performance measurement causes the plurality of counters to reset and then count events associated with processing the first instruction. In some implementations, the trigger circuitry is configured to trigger the performance measurement based on an AND selection of multiple counters of the plurality of counters meeting predefined values. In some implementations, the trigger circuitry is configured to trigger the performance measurement based on an OR selection of multiple counters of the plurality of counters meeting predefined values. In some implementations, the apparatus may include packet generation circuitry configured to generate a packet indicating the performance measurement, wherein the packet includes one or more counts, from the plurality of counters, represented in a format including a mantissa and an exponent. In some implementations, the apparatus may include packet generation circuitry configured to generate a packet indicating the performance measurement, wherein a length of the packet is variable based on a selection of one or more counts from the plurality of counters. In some implementations, the apparatus may include tagging circuitry configured to tag the first instruction at an initial stage of the pipeline to enable determining the performance measurement as the first instruction moves through subsequent stages of the pipeline.

Some implementations may include a non-transitory computer readable medium comprising a circuit representation that, when processed by a computer, is used to program or manufacture an integrated circuit comprising: a plurality of counters configured to count events associated with processing instructions in a pipeline of a processor, wherein counters of the plurality of counters are configured to count different events; and trigger circuitry configured to trigger a performance measurement for a first instruction after counters of the plurality of counters meet predefined values, wherein triggering the performance measurement causes the plurality of counters to reset and then count events associated with processing the first instruction. In some implementations, the trigger circuitry is configured to trigger the performance measurement based on an AND selection of multiple counters of the plurality of counters meeting predefined values. In some implementations, the trigger circuitry is configured to trigger the performance measurement based on an OR selection of multiple counters of the plurality of counters meeting predefined values. In some implementations, the integrated circuit further comprises packet generation circuitry configured to generate a packet indicating the performance measurement, wherein the packet includes one or more counts, from the plurality of counters, represented in a format including a mantissa and an exponent. In some implementations, the integrated circuit further comprises packet generation circuitry configured to generate a packet indicating the performance measurement, wherein a length of the packet is variable based on a selection of one or more counts from the plurality of counters. In some implementations, the integrated circuit further comprises a pseudo random number generator used to randomize a selection of the first instruction. In some implementations, the integrated circuit further comprises tagging circuitry configured to tag the first instruction at an initial stage of the pipeline to enable determining the performance measurement as the first instruction moves through subsequent stages of the pipeline.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method, comprising:

counting, via a plurality of counters, events associated with processing instructions in a pipeline of a processor, wherein a first counter of the plurality of counters is configured to count a first event and a second counter of the plurality of counters is configured to count a second event different from the first event; and triggering a performance measurement for a first instruction based on an AND selection of the first counter meeting a corresponding first predefined value and the second counter meeting a corresponding second predefined value, wherein triggering the performance measurement causes the plurality of counters to reset, wherein the performance measurement comprises counting events associated with processing the first instruction, and wherein the first counter and the second counter used for the AND selection are reused to count the events associated with processing the first instruction.

2. The method of claim 1, further comprising:

generating a packet indicating the performance measurement, wherein the packet includes one or more counts, from the plurality of counters, represented in a format including a mantissa and an exponent.

3. The method of claim 1, further comprising:

generating a packet indicating the performance measurement, wherein a length of the packet is variable based on a selection of one or more counts from the plurality of counters.

4. The method of claim 1, further comprising:

tagging the first instruction at a fetch stage of the pipeline to enable determining the performance measurement as the first instruction moves through subsequent stages of the pipeline.

5. The method of claim 1, further comprising:

transmitting, from a stage of the pipeline, an indication that the first instruction has been canceled; and stopping counts from the plurality of counters based on the indication.

6. The method of claim 1, wherein triggering the performance measurement comprises:

randomizing a selection of the first instruction using a pseudo random number generator.

7. The method of claim 1, wherein the plurality of counters are configured to count-down to trigger the performance measurement then count-up to generate the performance measurement.

8. The method of claim 1, wherein the events include cache level misses, translation lookaside buffer (TLB) level misses, branch mispredictions, instructions retired from the pipeline, and total cycles.

9. An apparatus, comprising:

a processor including pipeline;

a plurality of counters configured to count events associated with processing instructions in the pipeline, wherein a first counter of the plurality of counters is configured to count a first event and a second counter of the plurality of counters is configured to count a second event different from the first event; and trigger circuitry configured to trigger a performance measurement for a first instruction based on an AND selection of the first counter meeting a corresponding first predefined value and the second counter meeting a corresponding second predefined value, wherein triggering the performance measurement causes the plurality of counters to reset, wherein the performance measurement comprises counting events associated with processing the first instruction, and wherein the first counter and the second counter used for the AND selection are reused to count the events associated with processing the first instruction.

10. The apparatus of claim 9, further comprising:

packet generation circuitry configured to generate a packet indicating the performance measurement, wherein the packet includes one or more counts, from the plurality of counters, represented in a format including a mantissa and an exponent.

11. The apparatus of claim 9, further comprising:

packet generation circuitry configured to generate a packet indicating the performance measurement, wherein a length of the packet is variable based on a selection of one or more counts from the plurality of counters.

12. The apparatus of claim 9, further comprising:

tagging circuitry configured to tag the first instruction at an initial stage of the pipeline to enable determining the performance measurement as the first instruction moves through subsequent stages of the pipeline.

13. A non-transitory computer readable medium comprising a circuit representation that, when processed by a computer, is used to program or manufacture an integrated circuit comprising:

a plurality of counters configured to count events associated with processing instructions in a pipeline of a processor, wherein a first counter of the plurality of counters is configured to count a first event and a second counter of the plurality of counters is configured to count a second event different from the first event; and trigger circuitry configured to trigger a performance measurement for a first instruction based on an AND selection of the first counter meeting a corresponding first predefined value and the second counter meeting a corresponding second predefined value, wherein triggering the performance measurement causes the plurality of counters to reset, wherein the performance measurement comprises counting events associated with processing the first instruction, and wherein the first counter and the second counter used for the AND selection are reused to count the events associated with processing the first instruction.

14. The non-transitory computer readable medium of claim 13, wherein the integrated circuit further comprises:

packet generation circuitry configured to generate a packet indicating the performance measurement, wherein the packet includes one or more counts, from the plurality of counters, represented in a format including a mantissa and an exponent.

15. The non-transitory computer readable medium of claim 13, wherein the integrated circuit further comprises:

packet generation circuitry configured to generate a packet indicating the performance measurement, wherein a length of the packet is variable based on a selection of one or more counts from the plurality of counters.

16. The non-transitory computer readable medium of claim 13, wherein the integrated circuit further comprises:

a pseudo random number generator used to randomize a selection of the first instruction.

17. The non-transitory computer readable medium of claim 13, wherein the integrated circuit further comprises:

tagging circuitry configured to tag the first instruction at an initial stage of the pipeline to enable determining the performance measurement as the first instruction moves through subsequent stages of the pipeline.

* * * * *